(12) United States Patent
Cegnar et al.

(10) Patent No.: US 8,604,754 B2
(45) Date of Patent: Dec. 10, 2013

(54) UNIVERSAL POWER INTERFACE BUS

(75) Inventors: Erik J. Cegnar, Moscow, ID (US); Fred Jessup, Moscow, ID (US); Michael Maughan, Moscow, ID (US); David G. Alexander, Moscow, ID (US)

(73) Assignee: Ivus Industries, LLC, Moscow, ID (US)

( * ) Notice: Subject to any disclaimer, the term of this patent is extended or adjusted under 35 U.S.C. 154(b) by 536 days.

(21) Appl. No.: 12/880,023

(22) Filed: Sep. 10, 2010

(65) Prior Publication Data

US 2011/0057615 A1 Mar. 10, 2011

Related U.S. Application Data

(60) Provisional application No. 61/241,372, filed on Sep. 10, 2009.

(51) Int. Cl.
*H02J 7/00* (2006.01)
*H02J 7/04* (2006.01)
*H02J 7/16* (2006.01)

(52) U.S. Cl.
USPC ............ 320/128; 320/126; 320/127; 320/132; 320/136; 320/152

(58) Field of Classification Search
CPC ....................................... Y02E 60/12
USPC ......................................... 320/128
See application file for complete search history.

(56) References Cited

U.S. PATENT DOCUMENTS

| | | |
|---|---|---|
| 4,965,738 A | 10/1990 | Bauer et al. |
| 5,206,097 A | 4/1993 | Burns |
| 5,504,413 A | 4/1996 | Fernandez |
| 5,561,361 A | 10/1996 | Sengupta |
| 5,572,110 A | 11/1996 | Dunstan |
| 5,606,242 A | 2/1997 | Hull et al. |
| 5,764,030 A | 6/1998 | Gaza |
| 6,031,353 A | 2/2000 | Banyas |
| 6,252,373 B1 | 6/2001 | Stefansson |
| 6,337,557 B1 | 1/2002 | Kates |
| 6,362,597 B2 | 3/2002 | Leppo |
| 6,614,232 B1 | 9/2003 | Mukai |
| 6,741,066 B1 | 5/2004 | Densham |
| 6,809,649 B1 | 10/2004 | Wendelrup |
| 7,088,076 B2 | 8/2006 | Densham |
| 7,336,054 B2 | 2/2008 | Crisp |
| 7,598,701 B2* | 10/2009 | Odaohhara .................. 320/106 |
| 7,737,662 B2 | 6/2010 | Lu |
| 7,834,591 B2 | 11/2010 | Hussain |
| 2007/0188134 A1 | 8/2007 | Hussain |
| 2008/0185995 A1 | 8/2008 | Carrier |
| 2008/0238357 A1* | 10/2008 | Bourilkov et al. ............ 320/106 |

(Continued)

OTHER PUBLICATIONS

Ansso Chargers, Feb. 19, 2008, http://web.archive.org/web.archive.org/web/20080219223913/http://www.anssotech.com/products/chargers.htm.

(Continued)

*Primary Examiner* — Edward Tso
*Assistant Examiner* — Ahmed Omar
(74) *Attorney, Agent, or Firm* — Buchanan Nipper (57) ABSTRACT

A circuit and communication method for charging and/or discharging electrical energy storage devices (e.g., one or more cells of ultracapacitors, one or more cells of batteries, one or more cells of ultracapacitors and batteries).

8 Claims, 6 Drawing Sheets

(56) References Cited

U.S. PATENT DOCUMENTS

2009/0045775 A1* 2/2009 Popescu Stanesti et al. . 320/126
2010/0270979 A1 10/2010 Bonkhoff
2010/0287389 A1 11/2010 Gangsto

OTHER PUBLICATIONS

Benchmarq Microelectronics Inc., Dec. 11, 1998, "Smart Battery Charger Specification."

* cited by examiner

UNIVERSAL POWER INTERFACE BUS

PRIORITY/CROSS-REFERENCE TO RELATED APPLICATIONS

This application claims the benefit of U.S. Provisional Application No. 61/241,372, filed Sep. 10, 2009, the disclosure of which is incorporated by reference.

TECHNICAL FIELD

The disclosure generally relates to the field of electronics. Particular embodiments relate to processes, methods and interfaces for charging and discharging energy storage systems.

SUMMARY OF THE DISCLOSURE

The presently disclosed and claimed inventive concept(s) provides a circuit and communication method for charging and/or discharging electrical energy storage devices. One embodiment of the inventive concept(s) provides a four wire universal bus that allows an energy storage device to be charged and discharged by a charging system while digital data is communicated between the charging system and the energy storage device.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DEFINITIONS

In the following description and in the figures, like elements are identified with like reference numerals.

The use of "e.g.," "etc.," and "or" indicates non-exclusive alternatives without limitation unless otherwise noted.

The use of "including" means "including, but not limited to," unless otherwise noted.

The use of "rechargeable battery" means a group of one or more secondary electrochemical cells, unless otherwise noted. Examples of such secondary electrochemical cells include, but are not limited to, lead-acid batteries, nickel cadmium (NiCd) batteries, nickel metal hydride (NiMH) batteries, lithium-ion (Li-ion) batteries, lithium polymer, lithium-ion polymer (Li-ion polymer) batteries, lithium iron phosphate batteries, batteries including nanophosphate, lithium-titanate batteries, and "advanced batteries" which require some form of a management system.

The use of "advanced capacitor" means any device where one or more of the electrodes utilize the double layer effect, unless otherwise noted. Examples of such devices include, but are not limited to, electric double layer capacitors (EDLC), lithium capacitors, lithium ion capacitors (LIC), and pseudocapacitors. Electric double layer capacitors are also known as ultracapacitors or supercapacitors. Pseudocapacitors are also known as hybrid capacitors.

The use of "electrical device" means a device powered by an energy storage device or energy pack, an energy storage device or energy pack itself, and/or a device powered by and including an energy storage device or energy pack, unless otherwise noted. The energy storage device or energy pack may be integral to the electrical device (where the energy storage device is charged by plugging the electrical device into a charger) or separate from the electrical device (the energy storage device or energy pack is removed from the electrical device before the energy storage device or energy pack is charged).

The use of "energy storage device" means a cell that stores electrical energy for powering an electrical device, unless otherwise noted. Energy storage devices include, but are not limited to, rechargeable batteries, capacitors, advanced capacitors, and combinations thereof.

The use of "energy pack" means a device consisting of one or more energy storage device cells of one or more types of cell chemistries, unless otherwise noted. An energy pack can be configured to interface with another system for functions such as charging and/or discharging, for instance being configured for connection to a charging system and/or integrated into an electrical device which is configured for connection to a charging system.

The use of "management circuit" means a process and method for optimizing a particular performance objective by: measuring various energy storage parameters, making decisions based on these parameters, and commanding or halting the transfer of electrical energy accordingly, unless otherwise noted.

The use of "charging system" means a system for the charging and/or discharging of at least one energy storage device, unless otherwise noted.

The use of "charger device" means a device connected to a power source, the charger device for charging or recharging at least one energy storage device, unless otherwise noted.

The use of "digital controller" means a device which follows a defined process, which is capable of performing digital calculations, receiving inputs signals and providing output signals, unless otherwise noted. Digital controllers include, but are not limited to, microcontrollers, state machines, application specific integrated circuits (ASIC), field programmable gate arrays (FPGA), programmable logic arrays (PLA), and complex programmable logic devices (CPLD).

The use of "microcontroller" means a small computer on a single integrated circuit containing a processor core, memory, and programmable input/output peripherals, unless otherwise noted.

The use of "programmable logic array" (PLA) means a programmable device used to implement combinational logic circuits, unless otherwise noted.

DETAILED DESCRIPTION OF THE EXEMPLARY EMBODIMENTS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

One embodiment of the presently disclosed inventive concept(s) is charging system. The charging system includes a circuit and communication method for charging and/or discharging energy packs. The energy packs can be, but is not limited to, multiple cells of ultracapacitors, multiple cells of rechargeable batteries, and/or combinations thereof.

In one embodiment, the charging system includes a power bus (interface) that allows an energy pack to be charged and discharged by a charger while digital data is communicated between the charging system and the energy pack. The bus can be built into the charger or can be separate there-from. The power bus having a plurality of contacts. Preferably, the power bus is a four-wire universal bus that allows for the contacts to have virtually no electrical potential in relation to one another while the energy pack (or electrical device including an energy pack) is disconnected from the charging system (the energy pack has virtually no electrical potential, while the charger may or may not have electrical potential).

Preferably, the four-wire universal bus also provides the possibility of connecting multiple types of energy packs to a single charging system. For instance, energy pack A and energy pack B could connected to the bus in parallel and charged one at a time.

Preferably, the energy pack includes identification data. The identification data identifying the energy pack and/or energy storage device(s) in the energy pack individually (for instance, by serial number), and/or providing other data, such as, the type of energy pack, the make of the energy pack, the model of the energy pack, the composition and nature of energy storage devices in the energy pack, and the operating parameters of the energy pack. Based upon this identification data, the charging system can identify the energy storage device(s) within the energy pack and charge/discharge it appropriately.

Alternatively, the charging system can request from the energy pack (target device) digital data (parameters) and then charge said energy pack according to those parameters.

Another embodiment of the disclosed inventive concept allows for multiple energy packs to be connected in parallel. In such an embodiment, a serial digital interface is provided which enables the charging system to individually command each energy pack to turn on so that it can be charged and discharged.

Preferably, a digital controller is used to measure data, including but not limited to parameters regarding the state or condition of the energy storage device, an electrical device powered by the energy storage device, a charger device, and/or the environment in which said devices are used. For example, energy pack identification data, product identification data, the number of cells in an energy pack, the type of cells in an energy pack, cell temperature, cell voltage, cell electrical current, state of charge (SoC), and charge profile parameters.

An interface is used to electrically communicate information (data) and electrical energy between the energy pack and a charging system. Via the interface, the charging system can request and receive data from the energy pack, and charge/discharge the energy storage devices accordingly.

Embodiments of the inventive concept(s) provide the opportunity to use a universal charger for devices that may use many different cell chemistries and/or configurations.

Figure 1:
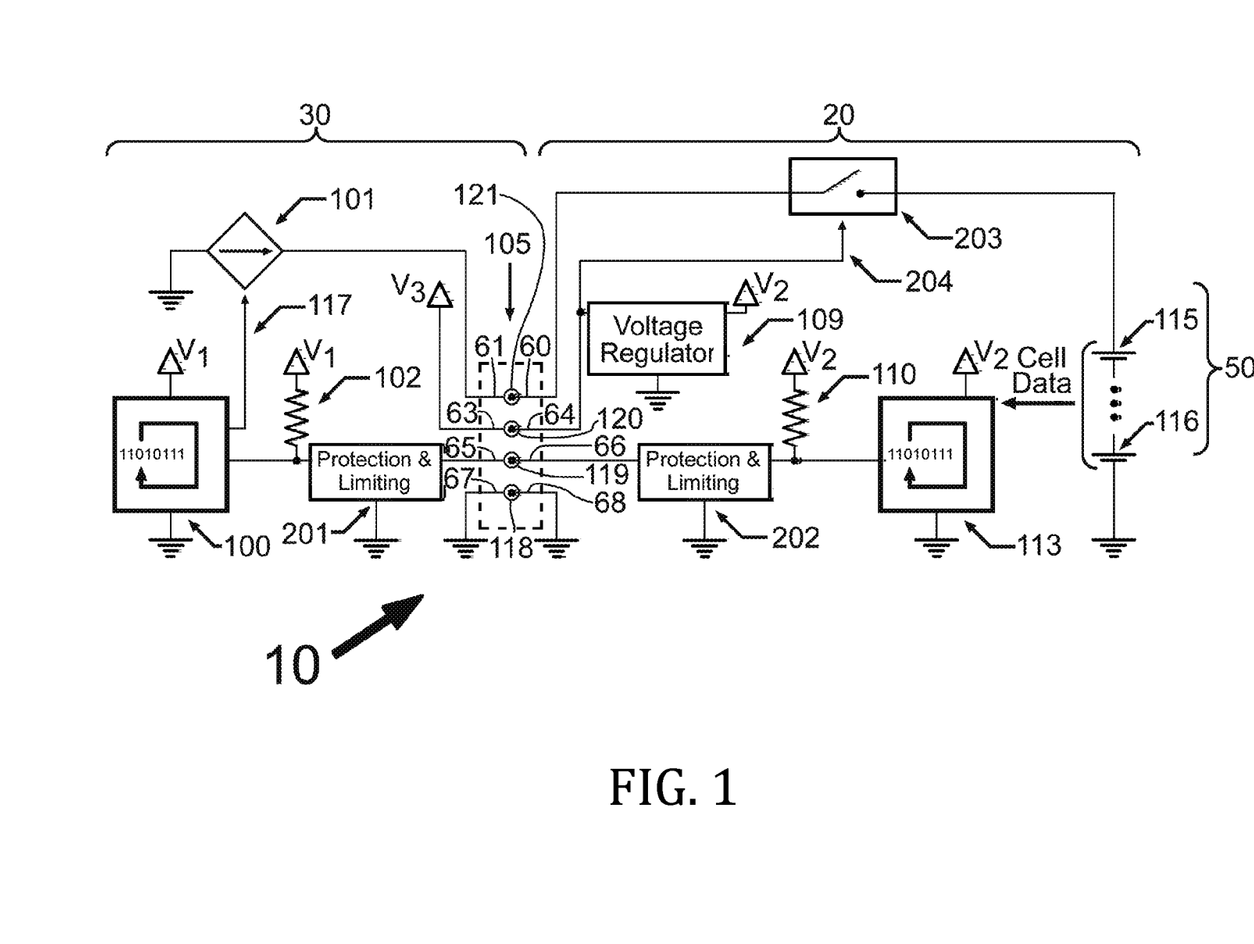
FIG. 1 is a schematic diagram showing one embodiment of the inventive concept(s).
Figure 2:
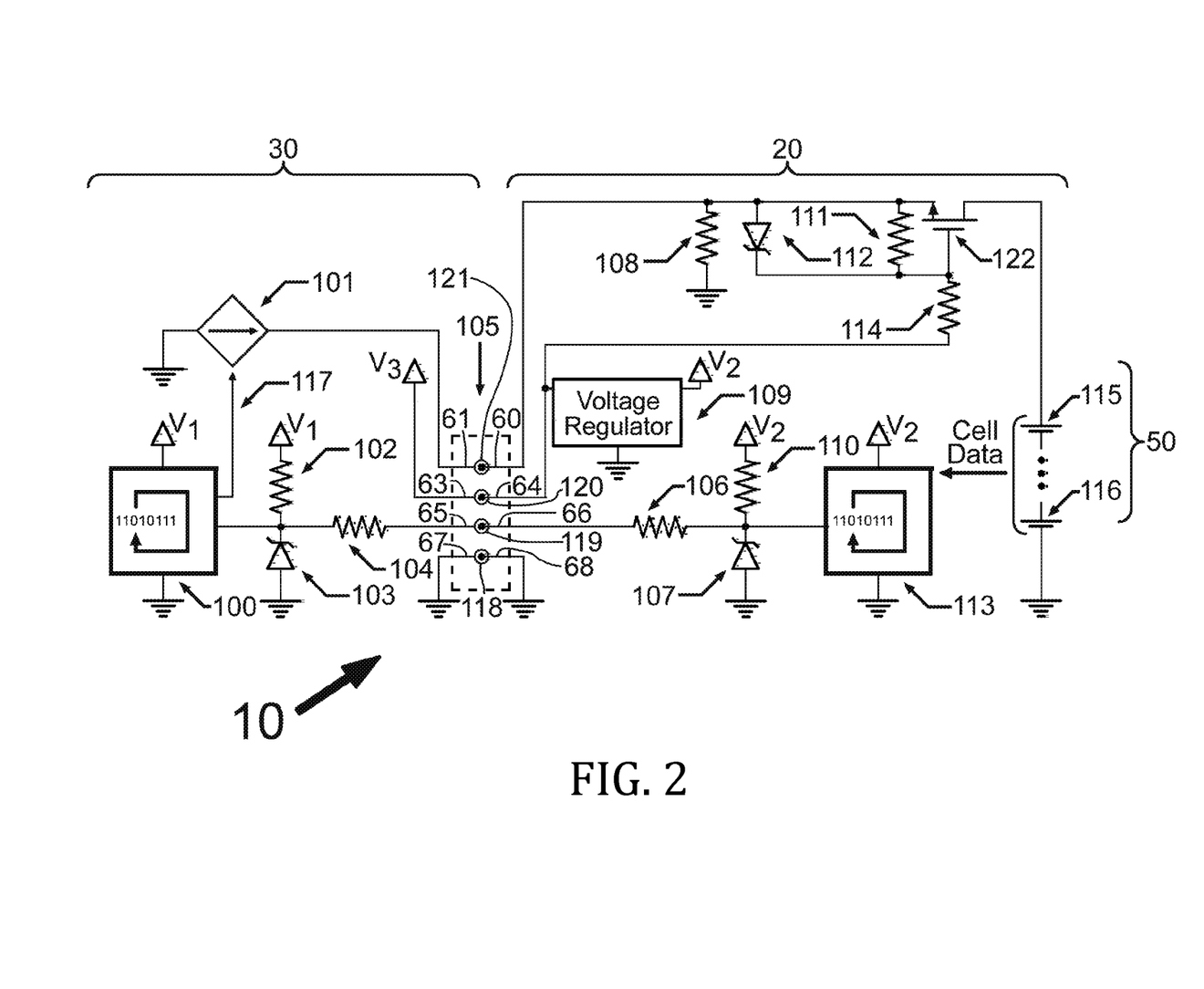
FIG. 2 is a schematic diagram of a second embodiment of the inventive concept(s).
Figure 3:
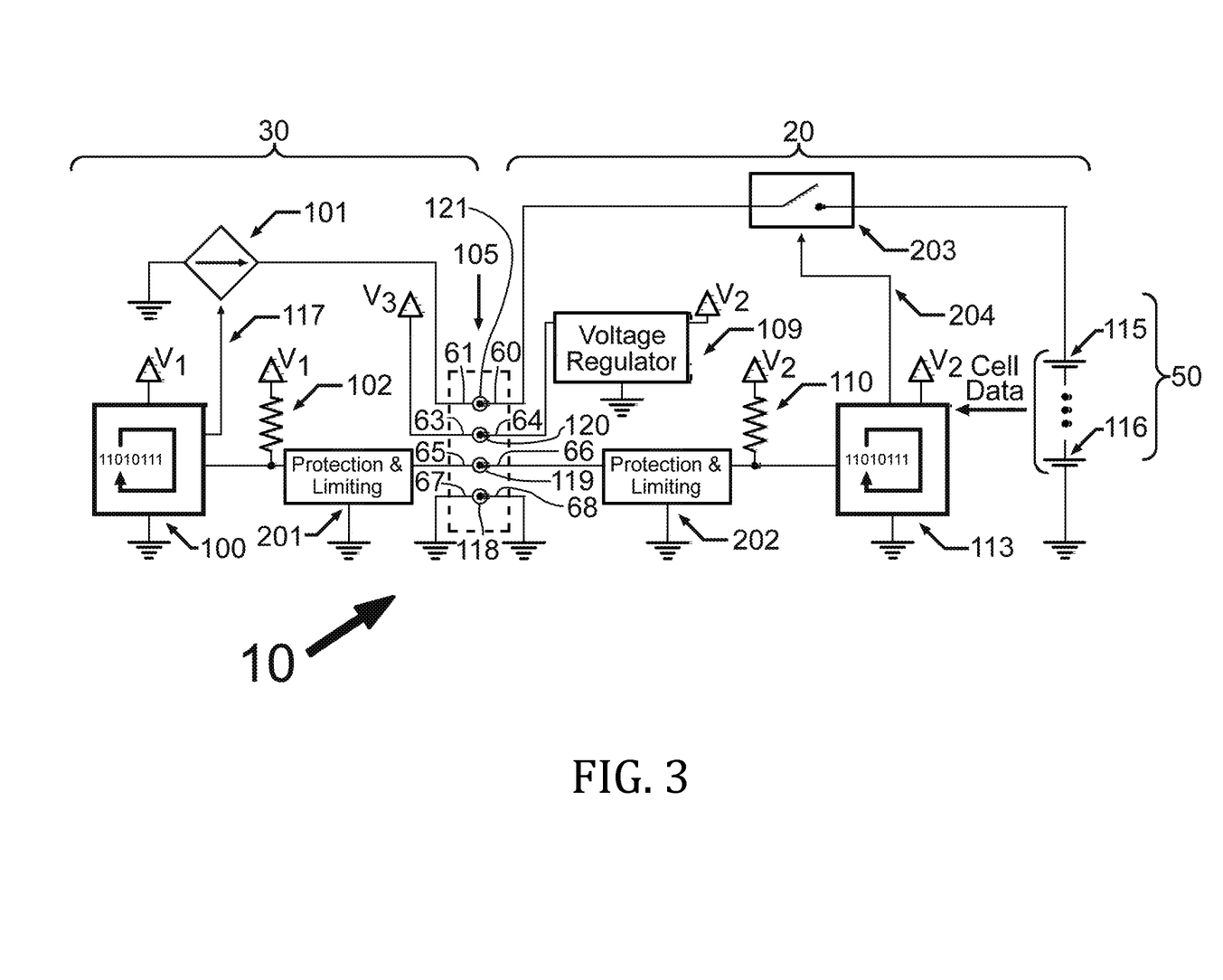
FIG. 3 is a schematic diagram of a third embodiment of the inventive concept(s).
Figure 4:
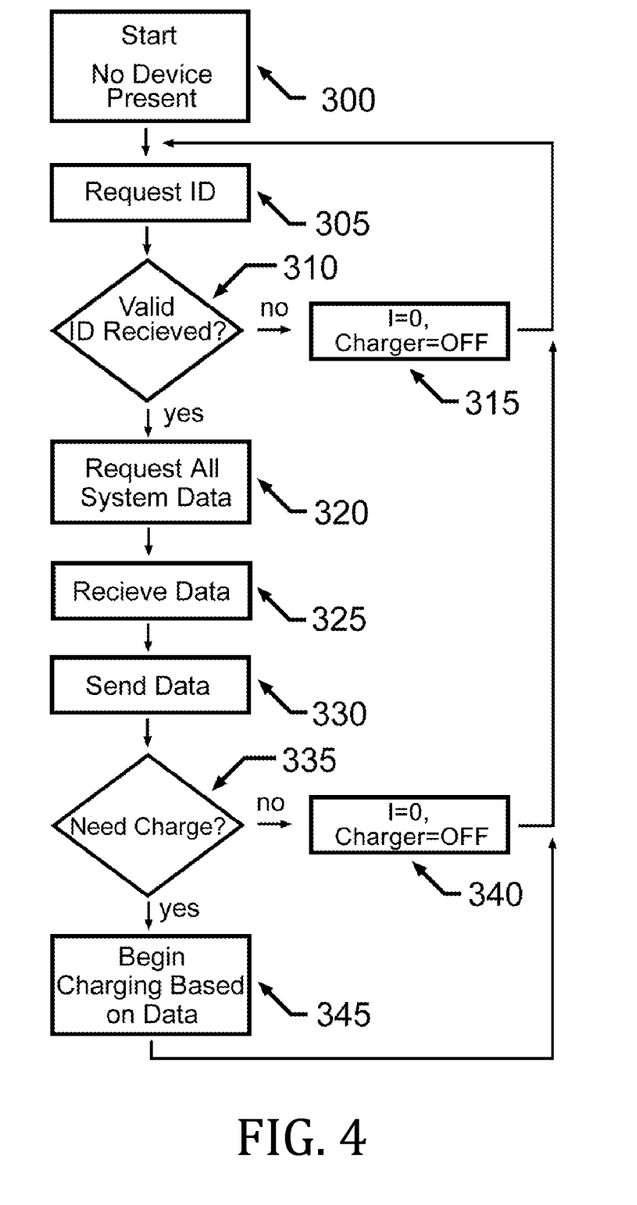
FIG. 4 is a flow chart of a fourth embodiment of the inventive concept(s).

FIG. 1 shows a circuit diagram showing a first embodiment of the disclosed inventive concept(s). FIG. 2 shows a schematic diagram of a second embodiment of the disclosed inventive concept(s). FIG. 3 is a schematic diagram of a third embodiment of the disclosed inventive concept(s). FIG. 4 is a flow chart of a fourth embodiment of the disclosed inventive concept(s). These Figures showing a charging system 10 comprising a process, method, and/or interface; the charging system 10 further comprising a charger 30, an interface (bus connector) 105 and an electrical device 20. Again, an "electrical device" can be a device powered by an energy pack, the energy pack itself, or a device powered by and including an energy pack.

The interface 105 is a connector which is used to connect/disconnect the charging system (charger device) from the target energy storage system (electrical device). In the embodiment shown in FIGS. 1-3, the electrical device and the charger device each have four connections (described below) which connect at the interface (bus) 105: a negative power connection 118, a positive power charging/discharging connection 121, an energizing connection 120, and a digital communication connection 119. The connections relating to four circuits: a ground circuit, a power circuit, an energizing circuit and a management circuit.

The ground circuit comprising a negative power connection 118 connecting with a common signal or ground. The negative terminal 64 of the electrical device 20 and the negative terminal 67 of the charger 30 connect at said negative power connection 118.

The power circuit for charging/discharging the electrical device's power pack. The power circuit connecting the charger 30 to the energy pack 50 of the electrical device 20. Preferably this is done via the positive terminal 60 of the electrical device 20 and the positive terminal 61 of the charger 30 connecting at the positive power charging/discharging connection 121 of the interface 105. The charger 30 includes a charging device 101 powered by a power source (e.g., AC power, vehicle 12 volt power systems). The charging device 101 receives a signal from the host side digital controller 100 to provide current to charge the target energy pack 50.

The energizing circuit for energizing and powering the management circuit when an electrical device (including an energy pack) is connected to the energizing connection 120 of the interface 105 of the charging system 10. The energizing circuit preferably including a voltage regulator 109. An example energizing circuit would be 12 volt. The energizing terminal 64 of the electrical device 20 and the energizing terminal 63 of the charger 30 connect at the energizing connection 120 of the interface 105.

The management circuit for managing the charging/discharging of the energy pack(s) of an attached electrical device. The management circuit including a digital communication connection 119 on said interface 105 for connecting the charger device's communication terminal 65 to the electrical device's communication terminal 66. It is preferred that the management circuit be configured for bi-directional serial digital communication.

The management circuit preferably includes a digital controller 113. The digital controller 113 receives cell data from the energy pack 50 (energy storage devices 115, 116), and is able to perform cell management functions, cell measurements, and environmental measurements.

The digital controller 113 can also control a switch 203 (FIGS. 1, 3), 122 (FIG. 2) in the power circuit, such as a mosfet or multiple mosfets, to connect the positive terminal 60 of the electrical device 20 to the charger 30. The digital controller 113 controls this switch 203 with a switch turn on/off signal 204. The digital controller 100 of the charger 30 can then send a command via the management circuit to the target digital controller 113 to turn off or turn on the switch 203 (FIGS. 1, 3), 122 (FIG. 2). Preferably, switch 203 is bidirectional in nature and which is controlled by an input signal 204. The digital controller 110 can send a signal 117 to the charger device 130 which controls how the energy pack 50 is charged. In one embodiment, based upon the identification (ID) provided by the energy pack, the digital controller can choose a suitable charging algorithm.

In another embodiment, the ID provided includes a suggested charging algorithm for the digital controller to utilize in charging the energy pack. Optionally, the digital controller could learn and remember the new charging algorithm for future reference the next time an energy pack having the same ID is charged.

The digital controller could be programmed to recognize IDs from incompatible devices, and upon determining that an incompatible device has been plugged in, add said incompatible device to a black list, disallowing any charging of said incompatible device.

In a second embodiment, the energizing circuit directly powers the switch 203 (FIGS. 1, 3), 122 (FIG. 2). This causes the positive power charging/discharging connection 121 to be connected to the energy pack 50 when the electrical device 20 is connected to the charger 30 via the interface 105.

Data is communicated between the charger 30 and energy pack 50 of the electrical device 20 through the management circuit and the bi-directional serial digital communication connection 119. Based on data sent to the energy pack and data received from the energy pack, the charger 30 can appropriately charge/discharge the energy pack 50.

Bi-directional serial digital data is preferably sent in packets consisting of multiple bytes of information. The charger 30, via the management circuit, requests information from the energy pack 50 and then the energy pack 50 responds back with the requested information (cell data). The data sent back is also in packet form. If no information is received back within a specified amount of time, the charger 30 concludes that an electrical device is not connected to the charger 30 via the interface 105.

Error checking is implemented so that electrical devices can be "hot" plugged in and removed without any undesirable behavior or malfunction.

Preferably, a protection and limiting circuit 201 on the charger 30 side and a protection and limiting circuit 202 on the electrical device 20 side limits the amount of current that can enter or exit the communication connection 119 of the interface 105. In this way, current is limited to-and-from the digital controller 100 of the charger 30 and to-and-from the digital controller 113 of the electrical device 20, preventing electrical damage that may be caused if both digital controllers transmitted data at the same time (collision).

Additionally, the voltage is limited by the protection and limiting circuits 201, 202 such that the charger 30 digital controller 100 and the electrical device digital controller 113 do not experience a voltage large enough to cause damage. In this way, the digital controllers/microcontrollers are protected from electrical events such as static electricity. The management circuit further comprising pull up resistors 102 and 110.

In an additional embodiment, the charging system may use some form of nonvolatile memory, e.g., EEPROM, in order to store parameters so that the next time the electrical device is energized (connected) those parameters could be used. For example, for some rechargeable batteries historical data (e.g., the history of charge that has entered or exited the battery, the number of charge cycles the pack has experienced) is desirable before the state of charge (SOC) can be computed. The historical charge data could be saved to nonvolatile memory so that the next time the electrical device is connected to the charger, the digital controller can utilize to the historical charge data previously stored in memory. The nonvolatile memory could also store other data for the charging system. The nonvolatile memory may be part of the digital controller 100, 113.

In FIG. 2, shown is a schematic similar to FIG. 1, where some blocks are replaced with circuit elements and show one possible way to perform the functions of the blocks shown in FIG. 1. FIG. 2 showing that a zener diode 103 is used to provide protection and voltage regulation for mismatched voltages on the data line and resistor 104 which works with zener 103 to provide protection/regulation. Likewise, resistor 106 works with zener diode 107 to provide protection and voltage regulation for mismatched voltages on the data line. Also shown are pulldown resistor 108, resistor 111, zener diode 112 for protecting the gate of mosfet, and resistor 114.

FIG. 3 is a schematic diagram of a third embodiment of the inventive concept(s) where the microcontroller provides a signal to turn on/off the charging/discharging connection to the energy pack.

FIG. 4 is a flow diagram illustrating a fourth embodiment of the inventive concept(s). The diagram starts at step 300 where no electrical device is connected to the charger via the bus. The charger, at step 305, requests an electrical device (if attached) to provide its ID via the communication circuit. If the charger does not receive a valid ID (step 310), the process returns to step 305. If a valid ID is received by the charger from the electrical device, the charger (via the communication circuit) will request all system data (step 320) from the electrical device. The electrical device, via the communication circuit, will send system data (e.g., historical charge data) to the charger (step 325). The charger (step 330) will then send data to the electrical device asking if it needs charged (step 335). If the electrical device indicates that a charge is needed, based on data, charging begins (step 345). If the electrical device does not indicate that a charge is needed (step 340), the process returns to step 305. After charging (step 345), the process returns to step 305.

Figure 5:
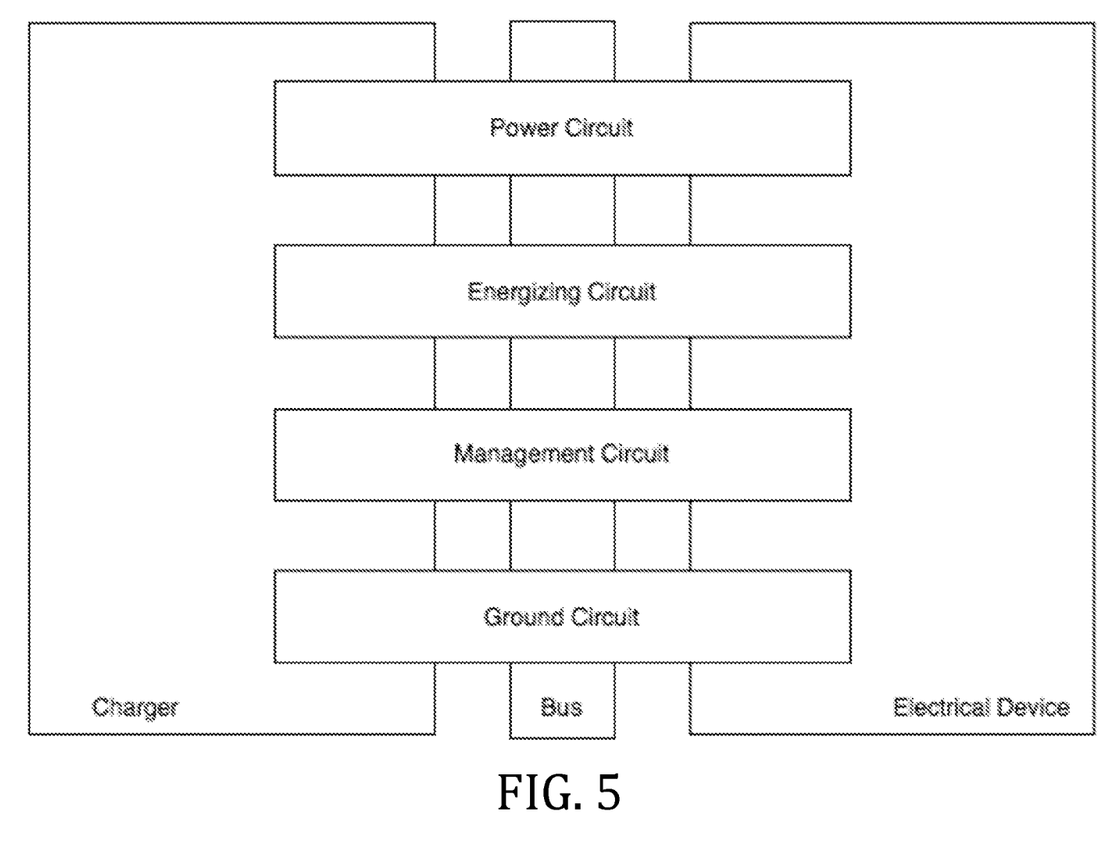
FIG. 5 is a schematic diagram of a fifth embodiment of the inventive concept(s).

FIG. 5 is a schematic diagram of a fifth embodiment of the inventive concept(s). FIG. 5 showing a charger device connected to an electrical device at a bus. The connection comprising a power circuit, an energizing circuit, a management circuit and a ground circuit.

Figure 6:
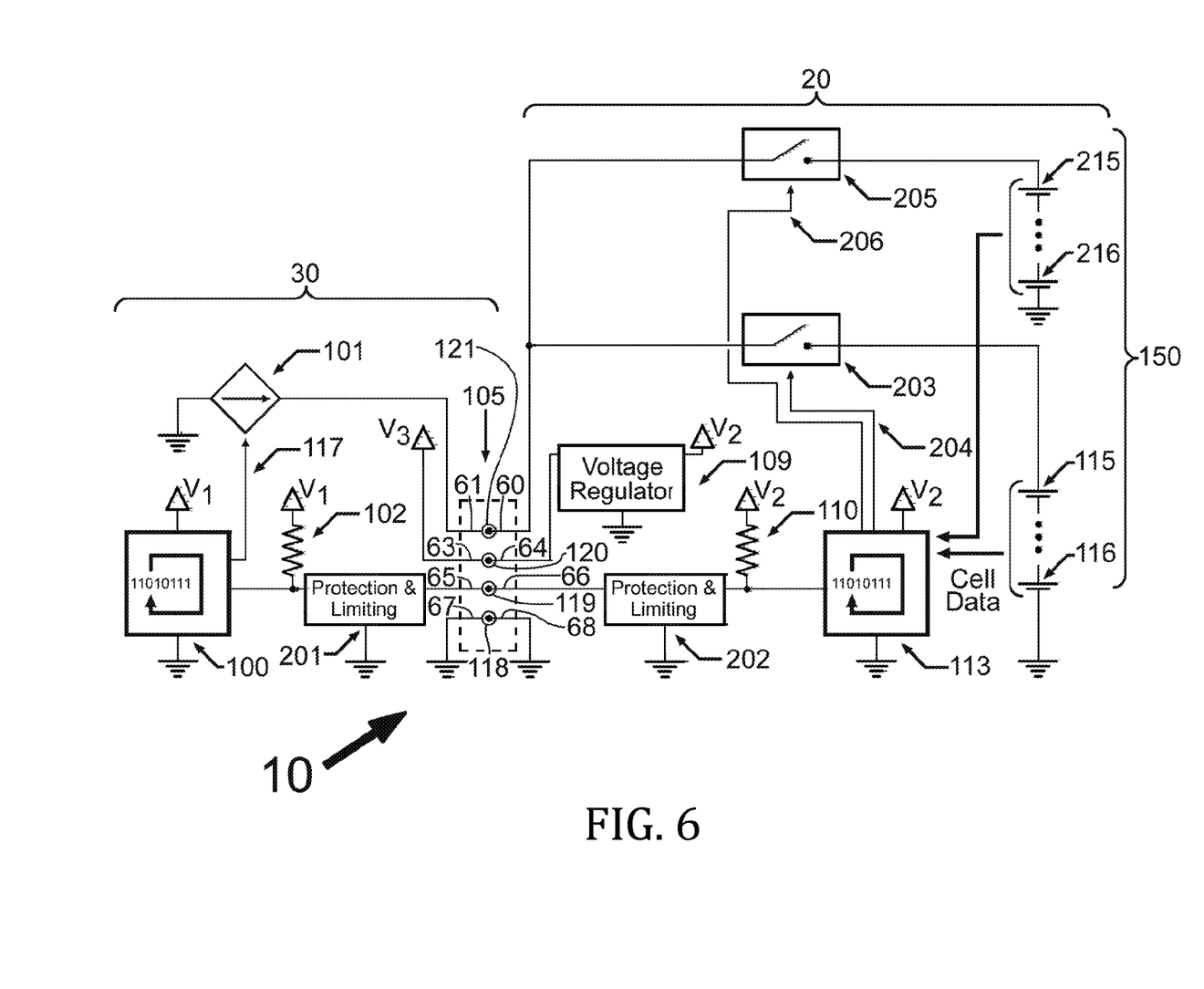
FIG. 6 is a schematic diagram of a sixth embodiment of the inventive concept(s).

FIG. 6 is a schematic diagram of a sixth embodiment of the inventive concept(s) showing multiple types of cell strings (energy storage devices 215/216, 115/116) combined into one energy pack 150. Each string having a switch 203, 205 in the power circuit controlled by the digital controller 113 via a switch turn on/off signal 204, 206. The digital controller able to connect and disconnect power to the strings thereby controlling the charging of said strings.

Example Embodiments

In one embodiment the charger and interface are configured to charge only one device at a time. A possible circuit to accomplish this is shown in FIG. 2.

In another embodiment the charger and interface are capable of charging multiple devices where the bus connection of the charger and target devices are connected in parallel. Devices all have unique identifiers and may have unique charging parameters. The charger periodically checks for all of the devices that are present and assigns and registers unique identifier numbers to each device. The charger then charges each device in a serial fashion. The charger via the interface communicates which device is to turn on and allow charge to flow into or out of the device.

In another embodiment the interface is used to discharge energy from devices. Multiple energy devices may be connected in parallel which are composed of the same or different types of electrical energy storage mechanisms. The device which is consuming the energy (e.g., a cordless drill or a flashlight powered by the discharged energy) uses the data to properly discharge the energy storage device.

In another embodiment the charging parameters may be contained in the charging side digital controller.

In another embodiment the charging parameters may be contained in the target energy storage side digital controller and then communicated to the charging/discharging side digital controller so that the target side can be charged or discharged based on those parameters.

In another embodiment the charging is built into the energy storage device and the charging current is provided by the energizing signal. In this embodiment only 3 wires are needed.

Another embodiment is a charging method for charging at least one energy pack with a charger. The method comprising the steps of: a) determining if said energy pack is connected to said charger by requesting identification data from said energy pack; b) repeating step a) until identification data is received from said energy pack; c) determining if the identification data provided by said energy pack is valid by comparing said identification data to stored data; d) returning to step a) if said identification data is not valid; e) requesting system data from said energy pack; f) analyzing said system data and determining if said energy pack needs to be charged; g) repeating step e) until said energy pack needs to be charged; h) analyzing said system data and determining a suitable charging algorithm for said energy pack; i) powering a charging circuit; j) charging said energy pack following said charging algorithm through use of said charger; k) monitoring the charge status of said energy pack and stopping the charging of said energy pack when said energy pack is charged; and l) repeating step a).

Another embodiment comprises a charging system. The charging system comprising at least one energy pack, a charger having a charging device, and a bus. The at least one energy pack having a negative power connection, a positive power connection, an energizing connection and a management connection. The charger having a negative power connection, a positive power connection, an energizing connection and a management connection. The bus interconnecting said at least one energy pack and said charger negative power connections to form a ground circuit. The ground circuit for connecting with a common ground. The bus interconnecting said at least one energy pack and said positive power connections to form a power circuit. The power circuit for charging/discharging said at least one energy pack via a charging device powered by a power source. The bus interconnecting said at least one energy pack and said energizing connections to form an energizing circuit. The energizing circuit for energizing and powering a management circuit. The bus interconnecting said at least one energy pack and said management connections to form said management circuit. The management circuit for managing the charging/discharging of said at least one energy pack. The management circuit comprising a first microcontroller configured for controlling said charging device. The first microcontroller preventing said charging device from supplying power said charger positive power connection when said charger is not connected to said at least one energy pack via said bus. The first microcontroller provides a signal to said charging device to provide a charging current to said at least one energy pack. Preferably, the power circuit comprises a switch, said switch able to be turned ON by said first microcontroller thereby providing a recharge current to said at least one energy pack, and said switch able to be turned OFF by said first microcontroller. Preferably, the at least one energy pack comprises a first energy pack and a second energy pack, said first and second energy packs connected in parallel, said power circuit comprises a first switch and a second switch, said first switch able to be turned ON by said first microcontroller thereby providing a recharge current to said first energy pack, and said first switch able to be turned OFF by said first microcontroller, said second switch able to be turned ON by said first microcontroller thereby providing a recharge current to said second energy pack, and said second switch able to be turned OFF by said first microcontroller. Preferably, the management circuit comprises a second microcontroller, said second microcontroller configured for measuring data related to said at least one energy pack. Preferably, the second microcontroller is configured measure energy pack cell voltage, energy pack cell current, energy pack state of charge, energy pack cell temperature, and/or energy pack charge profile parameters. Preferably, the second microcontroller requests identification from said at least one energy pack, and based upon said identification determines the appropriate charging algorithm to use in charging said at least one energy pack. Preferably, the second microcontroller receives a charge profile data from said at least one energy pack and said charging system charges said at least one energy pack according to said charge profile data. Preferably, the management circuit further comprises nonvolatile memory and said charge profile data is saved in said nonvolatile memory. Preferably, the second microcontroller determines that said at least one energy pack is charged and said management circuit directs the power circuit to stop supplying a charging current to said at last one energy pack. Preferably, the management circuit further comprises nonvolatile memory, said nonvolatile memory for storing data. Preferably, the stored data is data relating to a particular energy pack and/or data relating to energy pack charge algorithms.

While certain exemplary embodiments are shown in Figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the specification. The Abstract is neither intended to define the inventive concept(s) of the application, which is measured by the claims, nor is it intended to be limiting as to the scope of the inventive concept(s) in any way.

What is claimed is:

1. A charging system, said charging system comprising:
at least one energy pack, a charger having a charging device, and a bus;

said at least one energy pack having a negative power connection, a positive power connection, an energizing connection and a management connection, wherein said at least one energy pack comprises a first energy pack and a second energy pack, said first and second energy packs are connected in parallel;

said charger having a negative power connection, a positive power connection, an energizing connection and a management connection;

said bus interconnecting said at least one energy pack and said charger negative power connections to form a ground circuit, said ground circuit for connecting with a common ground; said bus interconnecting said at least one energy pack and said positive power connections to form a power circuit; said power circuit for charging/discharging said at least one energy pack via a charging device powered by a power source; said bus interconnecting said at least one energy pack and said energizing connections to form an energizing circuit; said energizing circuit for energizing and powering a management circuit; said bus interconnecting said at least one energy pack and said management connections to form said management circuit; said management circuit for managing the charging/discharging of said at least one energy pack; and said management circuit comprising a first microcontroller configured for controlling said charging device, said first microcontroller preventing said charging device from supplying power said charger positive power connection when said charger is not connected to said at least one energy pack via said bus, wherein said first microcontroller provides a signal to said charging device to provide a charging current to said at least one energy pack;

wherein said management circuit comprises a second microcontroller, said second microcontroller configured for measuring data related to said at least one energy pack, wherein said second microcontroller requests identification from said at least one energy pack, and based upon said identification determines the appropriate charging algorithm to use in charging said at least one energy pack;

wherein said power circuit comprises a switch, said switch able to be turned ON by said first microcontroller thereby providing a recharge current to said at least one energy pack, and said switch able to be turned OFF by said first microcontroller; and wherein said power circuit comprises a first switch and a second switch, said first switch able to be turned ON by said first microcontroller thereby providing a recharge current to said first energy pack, and said first switch able to be turned OFF by said first microcontroller, said second switch able to be turned ON by said first microcontroller thereby providing a recharge current to said second energy pack, and said second switch able to be turned OFF by said first microcontroller.

2. The charging system of claim 1, wherein said second microcontroller is configured measure energy pack cell voltage, energy pack cell current, energy pack state of charge, energy pack cell temperature, and/or energy pack charge profile parameters.

3. The charging system of claim 1, wherein said second microcontroller receives a charge profile data from said at least one energy pack and said charging system charges said at least one energy pack according to said charge profile data.

4. The charging system of claim 3, wherein management circuit further comprises nonvolatile memory and said charge profile data is saved in said nonvolatile memory.

5. The charging system of claim 1, wherein said second microcontroller determines that said at least one energy pack is charged and said management circuit directs the power circuit to stop supplying a charging current to said at least one energy pack.

6. The charging system of claim 1, wherein management circuit further comprises nonvolatile memory, said nonvolatile memory for storing data.

7. The charging system of claim 6, wherein said stored data is data relating to a particular energy pack.

8. The charging system of claim 6, wherein said stored data is data relating to energy pack charge algorithms.

* * * * *